(12) United States Patent
Konschak et al.

(10) Patent No.: US 11,005,310 B2
(45) Date of Patent: May 11, 2021

(54) METHOD FOR DETERMINING THE POSITION OF A CHARGING STATION FOR THE WIRELESS TRANSFER OF ELECTRIC POWER TO A VEHICLE

(71) Applicant: Bayerische Motoren Werke Aktiengesellschaft, Munich (DE)

(72) Inventors: Thomas Konschak, Siegenburg (DE); Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 52 days.

(21) Appl. No.: 16/438,224

(22) Filed: Jun. 11, 2019

(65) Prior Publication Data

US 2019/0291597 A1 Sep. 26, 2019

Related U.S. Application Data

(63) Continuation of application No. PCT/EP2017/080586, filed on Nov. 28, 2017.

(30) Foreign Application Priority Data

Dec. 13, 2016 (DE) ...................... 10 2016 224 804.9

(51) Int. Cl.
*H02J 7/00* (2006.01)
*H02J 50/90* (2016.01)
(Continued)

(52) U.S. Cl.
CPC ............ *H02J 50/90* (2016.02); *B60L 53/122* (2019.02); *B60L 53/126* (2019.02); *G01S 19/40* (2013.01);
(Continued)

(58) Field of Classification Search
CPC .......... G01S 19/51; G01S 19/40; G01S 19/49; H02J 50/90; H02J 50/10; H02J 50/80;
(Continued)

(56) References Cited

U.S. PATENT DOCUMENTS

| 6,864,836 B1 | 3/2005 | Hatch et al. |
| 2010/0103033 A1 | 4/2010 | Roh |

(Continued)

FOREIGN PATENT DOCUMENTS

| DE | 60 2004 009 590 T2 | 7/2008 |
| DE | 10 2010 027 729 A1 | 10/2011 |

(Continued)

OTHER PUBLICATIONS

PCT/EP2017/080586, International Search Report dated Mar. 2, 2018 (Three (3) pages).

(Continued)

*Primary Examiner* — Zixuan Zhou
(74) *Attorney, Agent, or Firm* — Crowell & Moring LLP

(57) ABSTRACT

A method for determining the position of a charging station for wirelessly transferring electric energy to a vehicle, wherein the charging station comprises a ground unit with a primary coil configured to generate an electromagnetic charging field for transferring electric energy to the vehicle, and wherein the vehicle comprises a receiving unit of a satellite positioning system and a secondary coil in the vehicle underbody, comprises performing, by the receiving unit of the vehicle, a plurality of position determination operations for at least part of the duration of a charging process during which the vehicle is arranged with respect to the ground unit such that the secondary coil of the vehicle has a predefined positional relationship with respect to the primary coil of the ground unit. The method also includes determining spatial coordinates of the receiving unit of the (Continued)

vehicle from the plurality of position determination operations, and inferring spatial coordinates of the primary coil of the ground unit from the known position of the receiving unit relative to the secondary coil in the vehicle.

17 Claims, 4 Drawing Sheets

(51) Int. Cl.
  *H02J 50/10*  (2016.01)
  *G01S 19/40*  (2010.01)
  *G01S 19/49*  (2010.01)
  *B60L 53/122*  (2019.01)
  *B60L 53/126*  (2019.01)
  *H02J 50/80*  (2016.01)

(52) U.S. Cl.
  CPC .............. *G01S 19/49* (2013.01); *H02J 50/10* (2016.02); *H02J 50/80* (2016.02); *Y02T 10/70* (2013.01); *Y02T 10/7072* (2013.01); *Y02T 90/12* (2013.01); *Y02T 90/14* (2013.01)

(58) Field of Classification Search
  CPC ...... B60L 53/122; B60L 53/126; Y02T 10/70; Y02T 90/12; Y02T 10/7072; Y02T 90/14

USPC .................................. 320/108, 109; 307/104
  See application file for complete search history.

(56) References Cited

U.S. PATENT DOCUMENTS

| 2014/0039728 A1* | 2/2014 | Imazu | ..................... B60L 15/20 |
| | | | 701/2 |
| 2016/0052450 A1 | 2/2016 | Chan et al. | |

FOREIGN PATENT DOCUMENTS

| DE | 10 2012 216 211 A1 | 3/2013 |
| DE | 10 2015 113 498 A1 | 2/2016 |
| DE | 10 2014 225 906 A1 | 6/2016 |
| GB | 2500691 A | 10/2013 |
| GB | 2533694 A | 6/2016 |
| WO | WO 2016/103164 A1 | 6/2016 |

OTHER PUBLICATIONS

German Search Report issued in German counterpart application No. 10 2016 224 804.9 dated Sep. 5, 2017, with Statement of Relevancy (Ten (10) pages).

\* cited by examiner

METHOD FOR DETERMINING THE POSITION OF A CHARGING STATION FOR THE WIRELESS TRANSFER OF ELECTRIC POWER TO A VEHICLE

CROSS REFERENCE TO RELATED APPLICATIONS

This application is a continuation of PCT International Application No. PCT/EP2017/080586, filed Nov. 28, 2017, which claims priority under 35 U.S.C. § 119 from German Patent Application No. 10 2016 224 804.9, filed Dec. 13, 2016, the entire disclosures of which are herein expressly incorporated by reference.

BACKGROUND AND SUMMARY OF THE INVENTION

The invention relates to a method for determining the position of a charging station for wirelessly transferring electric energy to a vehicle. The charging station comprises a ground unit with a primary coil which is set up to generate an electromagnetic charging field for transferring electric energy to the vehicle. The vehicle comprises a receiving unit of a satellite positioning system and a secondary coil in the vehicle underbody.

Vehicles with an electric drive typically have a battery in which electric energy for operating an electric motor of the vehicle can be stored. The battery of the vehicle can be charged with electric energy from a power supply system. For this purpose, the battery is coupled to the power supply system in order to transfer the electric energy from the power supply system to the battery of the vehicle. The coupling can be carried out in a wired (via a charging cable) and/or wireless (using inductive coupling between a charging station and the vehicle) manner.

One approach to the automatic, wireless inductive charging of the battery of the vehicle involves transferring electric energy to a battery of the vehicle from the ground to the underbody of the vehicle using magnetic induction via a so-called underbody clearance. The vehicle comprises a so-called secondary coil in the vehicle underbody, wherein the secondary coil is connected to a store (of the battery) using impedance matching and a rectifier. The secondary coil is typically part of a so-called "Wireless Power Transfer" (WPT) vehicle unit.

The secondary coil of the WPT vehicle unit can be positioned above a primary coil, wherein the primary coil is fitted, for example, on the floor of a garage, in a parking garage or in a rest area or parking space. The primary coil is typically part of a so-called WPT ground unit. The primary coil is connected to a power supply (also referred to as a charging unit). These units together form a charging station. The power supply may comprise a radio-frequency generator which generates an AC current (alternating current) in the primary coil of the WPT ground unit, thus inducing a magnetic field. This magnetic field is also referred to as an electromagnetic charging field. The electromagnetic charging field may have a predefined charging field frequency range. The charging field frequency range may be in the LF (low-frequency) range, for example between 80 kHz and 90 kHz, or in another LF range.

With sufficient magnetic coupling between the primary coil of the WPT ground unit and the secondary coil of the WPT vehicle unit via the underbody clearance, the magnetic field induces a corresponding voltage and therefore also a current in the secondary coil. The induced current in the secondary coil of the WPT vehicle unit is rectified by the rectifier and is stored in the store. The electric energy can therefore be wirelessly transferred from the power supply to the store of the vehicle. The charging operation can be controlled by a charging control device in the vehicle. This is also referred to as a WPT control device. For this purpose, the charging control device may be set up to communicate, for example wirelessly, with the charging unit or with the WPT ground unit.

For effective energy transfer via the electromagnetic charging field, it is necessary for the WPT vehicle unit to be positioned relatively accurately above the WPT ground unit. This positioning can be assisted by determining the position of the vehicle relative to the WPT ground unit.

For this purpose, the charging unit may have a receiving unit which is set up to receive a request signal from a transmitting unit of the vehicle. The request signal may comprise a request signal from a keyless entry function and/or a keyless engine start function of a vehicle. If the receiving unit is set up to determine a signal strength of the received request signal, the signal strength of the respective request signal can be used to determine the position of the vehicle, which emitted the request signal, relative to the charging unit and, in particular, relative to the WPT ground unit.

This method is known, in principle, from the prior art and is well proven in practice. However, it has the disadvantage that the request signal can be reliably received over a distance of only approximately 3 to 5 meters. Since future vehicles are intended to be increasingly provided with autonomous driving systems, it is necessary to already discern the exact position of the WPT ground unit from a relatively great distance in order to make it possible for the autonomous driving function to be able to correctly approach the WPT ground unit or the charging unit.

An object of the invention is to specify a method which makes it possible to already approach the charging station in a targeted manner from a relatively great distance. The exact knowledge of the position of the charging station is required for this purpose.

A method for determining the position of a charging station which is set up to wirelessly transfer electric energy to a vehicle is described. The charging station comprises a ground unit with a primary coil. The ground unit is set up to generate an electromagnetic charging field for transferring electric energy to the vehicle. The vehicle comprises a receiving unit of a satellite positioning system and a secondary coil in the vehicle underbody. The receiving unit of a satellite positioning system comprises a receiving antenna (antenna for short) and a receiver for processing the satellite signals received by the antenna. In the sense of the present invention, a satellite positioning system should be understood as meaning a GPS system (Global Positioning System) as well as a GNSS system (Global Navigation Satellite System), for example Galileo, Glonass or Compass. If reference is therefore made to a GPS system in the following description, this should generally be understood as meaning all satellite positioning systems.

The vehicle is, for example, a vehicle having an electric drive. It may be, in particular, a land vehicle, for example an automobile, a truck or a motorcycle.

In the method, the receiving unit of the vehicle carries out a multiplicity of position determination operations for at least part of the duration of a charging process during which the vehicle is arranged with respect to the ground unit in such a manner that the secondary coil of the vehicle has a predefined positional relationship with respect to the primary coil of the ground unit. In other words, this means that the receiving unit of the satellite positioning system of the vehicle receives satellite signals from a plurality of satellites according to its geographical position and processes said signals.

Spatial coordinates of the receiving unit of the vehicle are determined from the multiplicity of position determination operations which have been carried out. The spatial coordinates of the receiving unit of the vehicle are determined from the processing of the satellite signals received from a plurality of satellites. So that the receiving unit can determine its own position, it must receive satellite signals from at least four satellites. The unit's own position can be determined all the more accurately, the greater the number of satellites from which a satellite signal is received. The satellite signals contain an item of information relating to the respective position of the satellite and the time at which the satellite signal is emitted. The receiving unit calculates its own position from the positions transmitted by the satellites and the time. This is carried out on the basis of the time needed by a respective satellite signal from the satellite to the receiving unit and the transmitted position of the satellite. This procedure is known, in principle, to a person skilled in the art and therefore need not be described in any more detail at this point.

The spatial coordinates of the primary coil of the ground unit are then inferred from the known position of the receiving unit relative to the secondary coil in the vehicle.

The spatial coordinates of the ground unit which is arranged in a stationary manner and has the primary coil, which are determined using this method, can then be used as a navigation destination, for example by an autonomous driving function, during the next process of approaching the ground unit.

The consideration on which the method is based is the fact that a vehicle is arranged above the ground unit for a relatively long time during a charging process. Since the ground unit with its primary coil remains in a stationary form after installation, the position data captured by the vehicle during a charging process can be allocated as spatial coordinates of the ground unit and of the primary coil.

This procedure has the advantage that no additional components are needed to determine the position of a charging station having a ground unit and a primary coil. The position of the charging station or of its ground unit with the primary coil is determined with the aid of components present in the vehicle. In particular, the method can be completely implemented in the vehicle. In addition, the use of a receiving unit of a satellite positioning system of a vehicle has the advantage that the receiving unit is arranged in a manner optimized for reception in the vehicle roof. Better reception conditions can therefore be expected in comparison with an arrangement of a receiving unit in the charging station. Finally, the method makes it possible to easily adopt the position of the charging station as a "precise" destination into the navigation system of the vehicle.

The method also has the advantage that, on account of the multiplicity of position determination operations which are carried out, it allows the spatial coordinates of the receiving unit of the vehicle initially and finally of the primary coil of the ground unit to be determined with great precision since the problems which usually occur during position determination can be eliminated on account of the multiplicity of measurements.

Main errors of a satellite signal are errors caused by propagation time differences in the Earth's atmosphere and incorrect reception, for example on account of signal reflections. Since a charging process for charging the store of the vehicle can last for several hours and charging processes are carried out again and again over a long period, propagation time differences caused by the Earth's atmosphere can be averaged out on average. In addition, in the case of good reception conditions, it can be assumed that signal reflections by individual satellites occur only temporarily. Signal reflections of individual satellite signals occur (for example on account of reflections at surrounding buildings) only in the case of particular constellations of the satellites relative to the environment of the charging station since this is dependent on the geometry of surrounding conditions, for example buildings. Since the reception pattern is repeated regularly (every 12 hours), signals with interference can be detected and filtered out. Since the charging station does not move, temporary but good position determination therefore suffices to precisely determine the position coordinates.

A further consideration on which the method is based is that the determination of the spatial coordinates which is carried out for the receiving unit of the vehicle corresponds to the location of the antenna of the receiving unit. Since the arrangement of the antenna of the receiving unit relative to the secondary coil of the vehicle is known and an angle about the vertical axis of the vehicle with respect to a world coordinate system can also be determined from the multiplicity of position determination operations, the exact spatial coordinates of the secondary coil of the vehicle can be determined. Since the primary and secondary coils are above one another with an offset of a few centimeters during the charging process and this offset is determined during each charging process and can also be determined by the near-field method described at the outset, the position of the primary coil of the ground unit can be determined with a high degree of reliability.

It is expedient if the spatial coordinates of the receiving unit of the vehicle are determined from a partial number of the multiplicity of position determination operations which have been carried out, which partial number is determined by means of filtering. This means that not all position determination operations determined during the duration of the charging process are used to determine the spatial coordinates of the primary coil of the ground unit. Instead, there is a restriction to a selection of the "best" position determination operations and the spatial coordinates of the primary coil of the ground unit are determined therefrom.

The spatial coordinates of the receiving unit of the vehicle are expediently determined by filtering the position determination operations on the basis of a predetermined quality criterion. The quality criterion may comprise a number of received satellite signals and/or an individual assessment of the received satellite signals, in particular an assessment of a respective signal strength. The filtering makes it possible, for example, to filter out the above-mentioned signal reflections which periodically occur on the basis of the time of the position determination. In addition, propagation time differences in the Earth's atmosphere, for example as in the case of particular weather conditions, can be eliminated by taking into account the signal strength by considering, for example, only satellite signals from those satellites whose signal strength exceeds a particular level and the signal value has a good match to corresponding signal values. Implausible measurements are therefore sorted out. A measure of the quality of the determined spatial coordinates can also be the number of satellite signals available for a position determination operation.

The spatial coordinates of the primary coil of the ground unit can be stored in the vehicle. This is expedient, for example, when the charging station, with the ground unit and the primary coil, is arranged in a private environment, for example a garage or a private parking space. In such a case, the charging station is predominantly used by one vehicle. The charging station therefore does not require its own data storage of its spatial coordinates for its localization.

Provision may likewise be made for the spatial coordinates of the primary coil of the ground unit to be stored in the charging station. This is appropriate if a charging station is used by different vehicles. As a vehicle approaches a charging station, the charging station can transmit, for example, the spatial coordinates stored in it to the vehicle via a wireless communication channel, for example WLAN (Wireless Local Area Network), from a relatively great distance for approach.

It is also expedient if spatial coordinates of the primary coil of the ground unit which satisfy the predefined quality criterion are stored in a list. Only those spatial coordinates of the primary coil of the ground unit which represent a high degree of accuracy of the position are therefore contained in the list.

The number of spatial coordinates of the primary coil of the ground unit stored in the list expediently does not exceed a predefined number of spatial coordinates. This ensures that the list does not exceed a particular length in the case of a multiplicity of charging processes. It is sufficient, for example, if the predefined number of spatial coordinates is 50 or 200.

Provision may also be made for an estimated value of the spatial coordinates of the primary coil of the ground unit to be formed from the number of spatial coordinates of the primary coil of the ground unit stored in the list, wherein this estimated value is used as the assumed spatial coordinates of the primary coil for further processing. The estimated value can be formed by means of averaging or by means of weighted averaging with a quality measure. Alternatively or additionally, the estimated value can be formed by processing an item of time information relating to the capture of the spatial coordinates. In other words, this means that the spatial coordinates currently in the list are averaged, for example, for use for navigating a vehicle. As a result, the initially mentioned errors of propagation time differences in the Earth's atmosphere and/or the error in reception on account of signal reflections can be averaged.

The list having a number of spatial coordinates can be optionally stored in the vehicle or in the charging station.

It is also expedient if, in addition to the spatial coordinates of the primary coil of the ground unit, an item of information relating to a vehicle type, which was used to determine the spatial coordinates, is stored. This is appropriate, for example, when a charging station is used by a multiplicity of different vehicles for the purpose of charging the store. For example, the quality of the receiving unit of the vehicle determining the spatial coordinates can therefore be taken into account. This information can be taken into account in the quality measure, for example.

It may also be expedient if odometric data relating to the vehicle, which were determined when approaching the ground station, are processed for the purpose of determining the spatial coordinates. This makes it possible to determine the accuracy of the position determination, for example in those cases in which the satellite signal(s) is/are of merely low quality. This may be expedient, for example, in the urban environment or else when the charging station is arranged inside a building (for example a parking garage) or a garage.

Another expedient configuration provides for the spatial coordinates of the primary coil of the ground unit to be determined during each charging process of the vehicle. As a result, the spatial coordinates of the primary coil of the ground unit are permanently updated. If only the best position determination values are stored in said list, a more and more precise determination of the position of the primary coil of the ground unit results with increasing time.

The method explained in this description can be implemented with the aid of a software program which is set up to be executed by a processor (for example a control device of a vehicle) in order to thereby carry out the method. Such a software program can be stored on a storage medium which is set up to be executed on a processor and to thereby carry out the method described in this document.

The invention is described in more detail below on the basis of exemplary embodiments. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
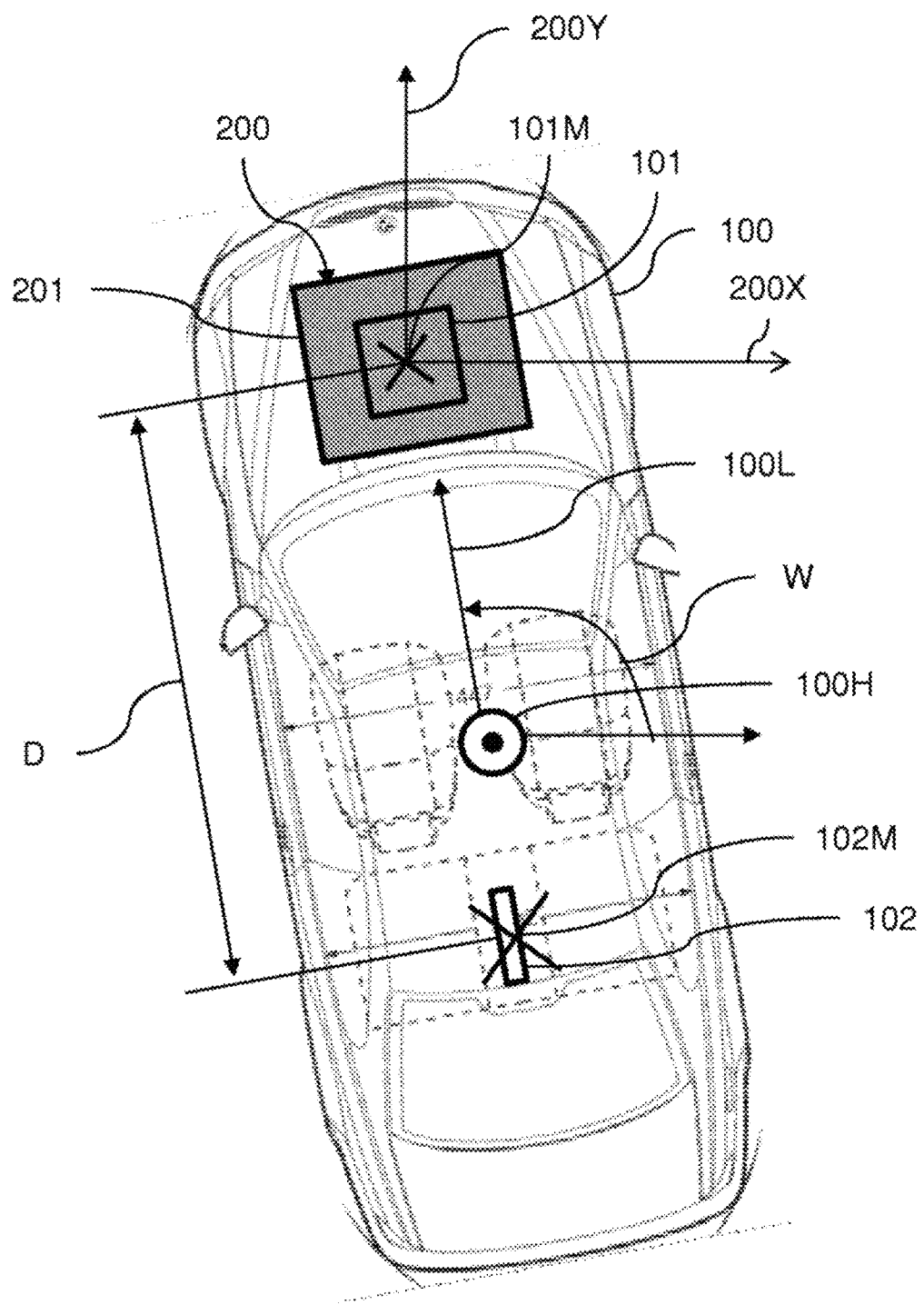
FIG. 1 shows a schematic illustration of a vehicle arranged above a ground unit of a charging station.

As described at the outset, the present document deals with the determination of the position of a charging station in order to use the determined position of the charging station, in particular for autonomous driving functions, for the approach of a vehicle to the charging station. The position of the charging station can be used, in particular, as a destination in a navigation system of the vehicle in order to make it possible to autonomously approach the charging station even from relatively great distances at which the position determination methods otherwise known from the prior art fail.

The method uses the fact that the charging station has a stationary position. This makes it possible to determine and improve the position of the charging station, more precisely spatial coordinates, for a satellite positioning system in an iterative manner by means of or during the use of the charging station to wirelessly transfer electric energy to a vehicle.

In a manner known to a person skilled in the art, a charging station 200 (see FIGS. 1 and 2) has a ground unit 201 with a primary coil (not illustrated) situated in the latter. The ground unit 201 with the primary coil is set up to generate an electromagnetic charging field for the purpose of transferring electric energy to the vehicle 100. For this purpose, the ground unit 201 is connected to a power supply 203 via a power controller 202. The power controller 202 is controlled by means of a computing unit 204 of the charging station 200.

On its underbody, the vehicle 100 has a vehicle unit 101 with a secondary coil (not illustrated). In order to wirelessly transfer electric energy from the ground unit 201 with the primary coil to the vehicle unit 101 with the secondary coil, the vehicle 100 is arranged above the ground unit 201 in such a manner that there is a predefined positional relationship between the primary coil of the ground unit 201 and the secondary coil of the vehicle unit 101. In this case, the primary coil and the secondary coil are separated from one another via an underbody clearance (that is to say a distance between the primary coil and the secondary coil).

The energy received by the vehicle unit 101 with the secondary coil is supplied to a rectifier 103 which rectifies the alternating current generated by the secondary coil and stores it in a battery 104 (store). In order to establish the predefined positional relationship between the primary coil of the ground unit 201 and the secondary coil of the vehicle unit 101, the vehicle unit 101 and the ground unit 201 may comprise sensors for local distance measurement. In this case, the data captured by the sensors 206 are supplied to the controller 204 for processing. A controller 109 receives the data received from the sensor 110 and processes said data. The controller 109 is also used to control the energy transfer and therefore captures the energy flow through the rectifier 103 and transmits it to the controller of the charging station 204.

As already described in the introduction, the vehicle 100 also comprises a receiving unit 102 of a satellite positioning system. The receiving unit 102, which is often also referred to as a GPS receiver, comprises an antenna (not illustrated in the figure) and the actual receiver for processing the satellite signals received by the antenna. The data received and processed by the receiving unit 102 are processed in a computing unit 105 using map data 106 held by a store in order to determine an exact position of the vehicle 100. This is a position of the receiving unit 102 and its antenna.

The vehicle 100 also has a computing unit 107 for estimating the vehicle position on the basis of vehicle odometry data provided by one or more sensors 108.

The computing units 105 and 107 may be different computing units. They may also be implemented in a single computing unit and may be designed, in particular, for the combined determination of the vehicle position, that is to say the position of the receiving unit 102.

Figure 2:
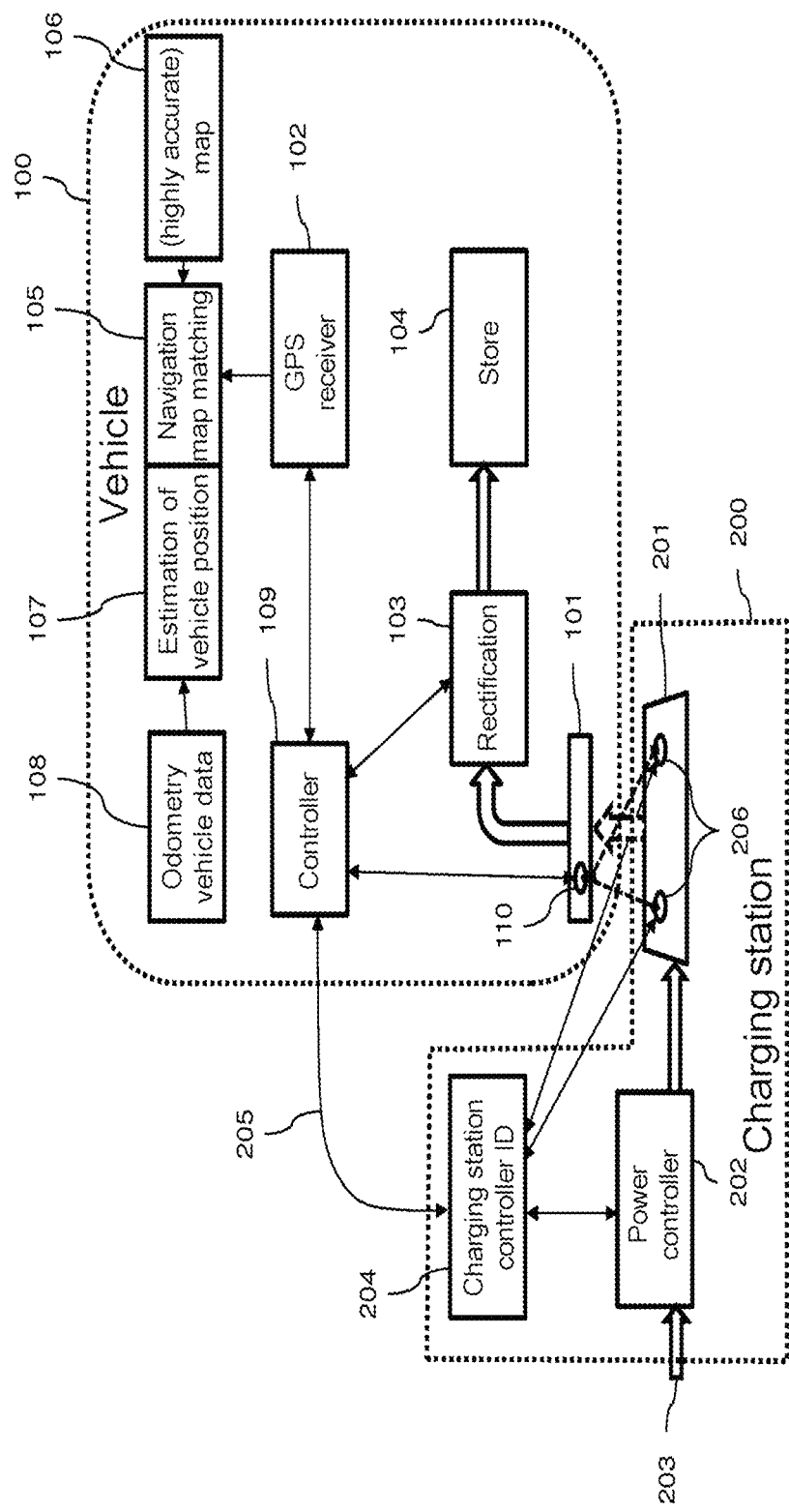
FIG. 2 shows a schematic illustration of the components of a vehicle and of a charging station for wirelessly transferring electric energy.

The method is based on the consideration of determining the position of the charging station 200 with the aid of the position determination system present in the vehicle 100. This is effected by carrying out a multiplicity of position determination operations by means of the receiving unit 102 of the vehicle for at least part of the duration of a charging process, as is schematically illustrated in FIG. 1, for example. During the duration of the charging process, the vehicle 100 is arranged with respect to the ground unit 201 of the charging station 200 in such a manner that the secondary coil of the vehicle 100 has the predefined positional relationship with respect to the primary coil of the ground unit 201. Spatial coordinates of the receiving unit 102, that is to say of the antenna, are determined from the multiplicity of position determination operations which have been carried out. Since, for a respective vehicle 100, it is known how the antenna is arranged relative to the vehicle unit 101 with the secondary coil, the spatial coordinates of the primary coil of the ground unit 201 can be inferred therefrom.

As is clear from the plan view in FIG. 1, the center point of the vehicle unit 101 is indicated using 101M and the center point of the receiving unit (or antenna) 102 is indicated using 102M. The center points 101M, 102M are at a distance D from one another, the value of which distance is known for a respective vehicle. In addition, an angle W about a vertical axis 100H of the vehicle 100 is determined with respect to a world coordinate system having a first axis 200X and a second axis 200Y. In the present exemplary embodiment, the angle W between a vehicle longitudinal axis 100L and the first axis 200X of the world coordinate system is determined in this case. The angle may be determined from a multiplicity of spatial coordinates of the vehicle when approaching the charging station 200 together with the odometry data relating to the vehicle. Determining the angle W makes it possible to determine the orientation of the primary coil of the vehicle unit 101 in relation to the receiving unit (or antenna) 102 with respect to the compass directions of the world coordinate system. As a result, the position of the secondary coil and therefore of the primary coil of the ground unit 201 of the charging station 200 can be inferred from the spatial coordinates of the vehicle or its receiving unit 102 with a very slight discrepancy.

Since an individual measurement is associated with uncertainties on account of the determination of the spatial coordinates, the measurement of the position of the receiving unit 102 of the vehicle and therefore the assignment of the spatial coordinates to the ground unit 201 of the charging station take place over a long time. Errors which mainly occur in a satellite navigation system are errors caused by propagation time differences in the Earth's atmosphere and errors when receiving signal reflections, for example on account of the geometry of surrounding buildings and the like.

These errors can, for the most part, be reliably eliminated by means of a multiplicity of measurements during the relatively long duration of a charging process. With respect to the errors caused by propagation time differences in the Earth's atmosphere, it can be assumed that these are averaged out on average by the Earth's atmosphere. With respect to the incorrect reception on account of signal reflections, it can be assumed that such signal reflections relate only temporarily to satellite signals from individual satellites. Such satellite signals "with interference" can be detected and filtered out. This error is not present in good, unreflected satellite signals. Since the charging station and its ground unit 201 are immovable, an occasional but good determination of the spatial coordinates with the aid of the satellite-based receiving unit 102 of the vehicle 100 therefore suffices.

Since the satellites of a satellite navigation system travel on predefined orbits with an orbit time of approximately 12 hours, a respective reception pattern is regularly repeated. Signal reflections of individual satellite signals therefore occur in this interval since they are caused by the geometry of surrounding buildings and the like. This can be taken into account during the quality assessment of the reception signals.

Figure 3:
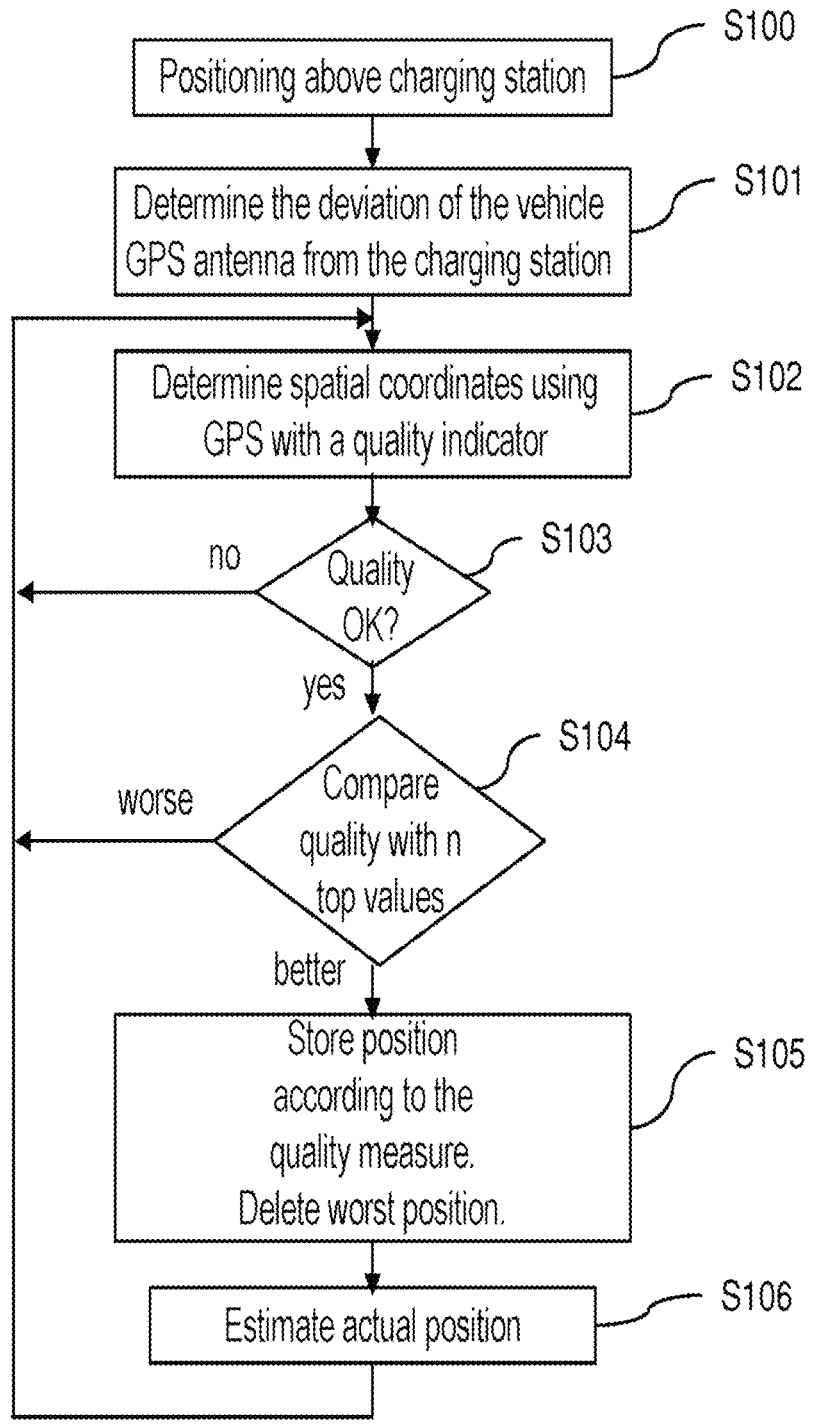
FIG. 3 shows a schematic illustration of a flowchart for iteratively determining the position of a charging station.

The spatial coordinates determined for the primary coil of the ground unit 201 are advantageously updated with each charging process. This is described on the basis of the flowchart in FIG. 3. The positioning of the vehicle 100 above the ground unit 201 of the charging station, as shown in FIG. 1, is first of all carried out (step S100). In step S101, the deviation of the receiving unit 102 of the vehicle 100 from the ground unit 201 of the charging station 200 is determined. This is carried out on the basis of the geometrical distances, shown in FIG. 1, between the receiving unit 102 and the vehicle unit 101 and the relative position between the vehicle unit 101 and the ground unit 201. In step S102, the spatial coordinates firstly of the receiving unit 102 and then of the ground unit 201 of the charging station 200, on the basis of the geometrical conditions, are determined. In this case, it is possible to use a quality indicator which indicates how good the quality of the determination of the spatial coordinates is. This can be carried out, for example, on the basis of the number of satellite signals available for determining the spatial coordinates and the respective signal strengths of the satellite signals. The check in order to determine whether the quality of the determined spatial coordinates is okay is carried out in step S103. If this is not the case ("no" path), step S102 is repeated. In contrast, if the quality of the determined spatial coordinates is okay ("yes" path), that is to say the quality criterion is above a predefined value, a check is carried out in step S104 in order to determine whether the currently determined spatial coordinates have a higher quality than previously determined n best values. If the spatial coordinates currently just determined are worse ("worse" path), the determined spatial coordinates are rejected and the method is continued with step S102. In contrast, if the currently determined spatial coordinates are better than the previously stored n best spatial coordinate values ("better" path), the position, expressed by the determined spatial coordinates, is stored in the list of the n best values at a position corresponding to the quality measure in step S105. The spatial coordinates with the worst quality measure are deleted from the list containing n values. The actual position is then estimated in step S106 from the list containing the n best values of the spatial coordinates. The estimated value can be determined, for example, by means of averaging. The estimated value may likewise be formed by means of weighted averaging with a quality measure. In addition, it is possible to include an item of time information, for example the time at which the stored spatial coordinates was determined.

The resulting list containing the n (n is 100, for example) best values for the spatial coordinates determined in the past for the ground unit 201 of the charging station 200 can be stored either in a store of the vehicle 100 and/or in a store of the charging station 200. The practice of storing the list containing the n best spatial coordinates in the vehicle 100 is appropriate when the vehicle approaches only a few charging stations and the charging stations 200 are predominantly used only by one vehicle. This is the case, for example, if a charging station is implemented in private surroundings.

If, in contrast, a charging station is used by a multiplicity of different vehicles, as is the case in publicly available charging stations, it is expedient if the list containing the best determined spatial coordinates is stored in a store of a central computing unit of the charging station. In this case, it is not necessary for the charging station to take into account which vehicle provides a currently determined spatial coordinate. As a result of the multiplicity of charging processes and the multiplicity of determined spatial coordinates, the method described above can be carried out by a computing unit of the charging station, as a result of which a list containing n best spatial coordinate values is then likewise formed.

The information relating to which vehicle or which vehicle type transmits a spatial coordinate can be useful for diagnostic purposes in order to be able to assess, for example, the quality of a receiving unit of a vehicle. Vehicle-specific corrections can therefore also be made when calculating a position.

Figure 4:
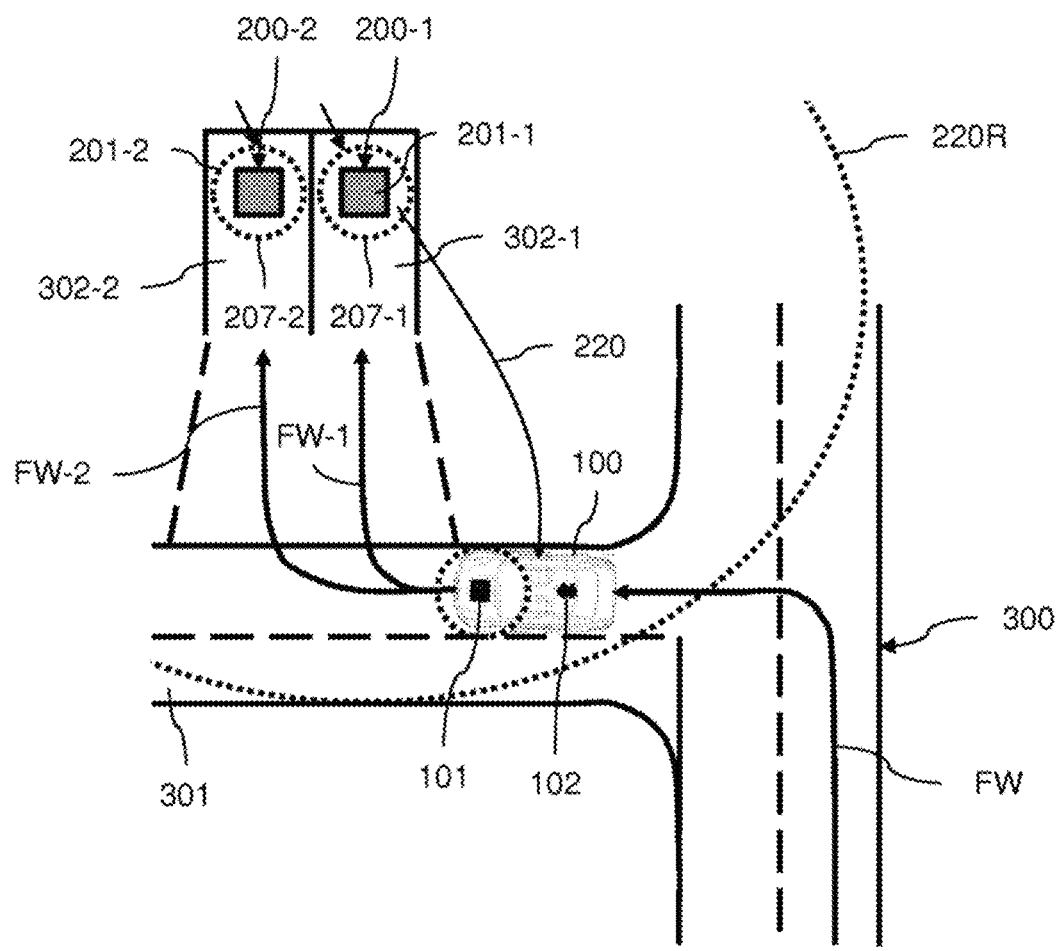
FIG. 4 shows a schematic illustration of a vehicle approaching one of two charging stations arranged beside one another.

FIG. 4 shows an exemplary situation of the manner in which it is possible to use a position of charging stations which is determined according to the invention. FIG. 4 shows a schematic plan view of the course of a road having a main road 300 and a road junction 301. Two parking spaces 302-1, 302-2 having a respective charging station 200-1, 200-2 are situated in the region of the road junction 301. The respective ground units 201-1, 201-2 of the charging stations 200-1, 200-2 are also illustrated in the figure. The reference signs 207-1, 207-2 are used to represent respective tolerance ranges of the determined spatial coordinates of the ground units 201-1, 201-2. Assuming that the parking spaces 302-1, 302-3 are at least 2.5 m wide and with the knowledge from experiments that the tolerance ranges 207-1, 207-2 can be determined with a diameter of less than 1 meter, the tolerance ranges 207-1, 207-2 do not overlap.

In addition, the reference sign 220R is used to represent the limit of a wireless communication connection of a computing unit (not illustrated) of the charging stations 200-1, 200-2. If the vehicle 100 now approaches along the route FW coming from the road 300 and turning into the road junction 301, the vehicle 100 receives the spatial coordinate(s) of the parking space 302-1 and/or 302-2 via the wireless communication connection. An autonomous parking function can now already autonomously head for the selected parking space 302-1 or 302-2 in an optimum manner by means of respective routes FW-1 or FW-2 using the spatial coordinates of one of the two parking spaces 302-1, 302-2 at a sufficiently great distance, with the result that there is an optimum positional relationship between the vehicle unit 101 with the secondary coil and the ground unit 201 with the primary coil.

The determination of the spatial coordinates of a charging station and the approach to a charging station, the spatial coordinates of which are known to the vehicle, can be assisted with the aid of the vehicle odometry data. In the case of sufficient approach using an autonomous driving function, provision may likewise be made for assistance to be carried out by means of, or changing to, one of the known positioning methods, for example using an LF (low-frequency) system. In addition, the method can be combined with local distance measuring methods, with the result that, in the case of short distances between the vehicle and the selected charging station, the vehicle undertakes the distance measurement. This applies both to the final determination of the parking position and when assisting with the parking process.

In order to increase the position quality, the satellite signals from individual satellites can be individually evaluated by the receiving unit 102. This makes it possible to reduce poor signals and systematic errors caused, in particular, by poor reception conditions of the environment. For example, individual satellite signals can be deliberately hidden for this purpose, in which case this can be implemented permanently or temporarily.

In order to generate a distance value which is as precise as possible, even if the vehicle 100 is still far away from a charging station 200, the positional accuracy of the vehicle 100 can be increased by matching to accurate maps and the optional use of an available differential GPS.

When approaching a charging station, a distance value can be indicated in each position by using vehicle odometry and suitable filtering as well as the transition from the use of a satellite positioning system to a local distance measurement.

One advantage of the method is that the algorithm and the data retention can be fully carried out in the vehicle. The charging station 200 requires only information provided via a wireless communication interface, for example WLAN. If many different vehicles are charged at a charging station, the algorithm and/or the data retention can be carried out in the charging station.

If the charging station 200 is in a region without reception of satellite signals, the vehicle position can continue to be calculated using vehicle odometry and the position of the charging station can be derived therefrom in the region of the charging station and can be improved with each approach. However, a continuous improvement in position is not possible during charging.

The method benefits from the expected development of greater positional accuracies of the vehicle for driver assistance systems, autonomous driving and the introduction of indoor navigation methods. Another advantage is that a distance between the vehicle 100 and a charging station 200 can be indicated from any desired distance. Obstacles between the vehicle 100 and the charging station do not influence the approach to the charging station 200. Another advantage is that charging stations can be adopted as a "precise" destination in a navigation system of the vehicle 100.

LIST OF REFERENCE SIGNS

100 Vehicle
100L Vehicle longitudinal axis
100H Vehicle vertical axis
101 Vehicle unit with secondary coil
101M Geometrical center point of the vehicle unit
102 Receiving unit of a satellite positioning system (GPS receiver)
102M Geometrical center point of the receiving unit
103 Rectifier
104 Store (battery)
105 Computing unit
106 Map data
107 Computing unit
108 Vehicle odometry
109 Controller
110 Near-field sensor
D Distance between 101M and 102M
W Angle between vehicle longitudinal axis 101L and first axis 200X
200, 200-1, 200-2 Charging station
200X First axis in a world coordinate system
200Y Second axis in a world coordinate system
201, 201-1, 201-2 Ground unit with primary coil
202 Power controller
203 Power supply
204 Controller of the charging station
205 Communication connection
207-1, 207-2 Tolerance range of the determined spatial coordinates of the ground unit
220R Limit of a wireless communication connection
300 Road
301 Road junction
301-1, 302-2 Parking space with charging station
FW Route
FW-1, FW-2 Route for approaching the parking space 301-1, 302-1
S100, . . . , S106 Method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining the position of a charging station for wirelessly transferring electric energy to a vehicle, wherein the charging station comprises a ground unit with a primary coil configured to generate an electromagnetic charging field for transferring electric energy to the vehicle, and wherein the vehicle comprises a receiving unit of a satellite positioning system and a secondary coil in the vehicle underbody, comprises:
    performing, by the receiving unit of the vehicle, a plurality of position determination operations for at least part of the duration of a charging process during which the vehicle is arranged with respect to the ground unit such that the secondary coil of the vehicle has a predefined positional relationship with respect to the primary coil of the ground unit;
    determining spatial coordinates of the receiving unit of the vehicle from the plurality of position determination operations; and
    inferring spatial coordinates of the primary coil of the ground unit from the known position of the receiving unit relative to the secondary coil in the vehicle.

2. The method according to claim 1, wherein determining spatial coordinates of the receiving unit comprises determining spatial coordinates of the receiving unit from a partial number of the plurality of position determination operations, which partial number is determined by filtering.

3. The method according to claim 1, wherein determining spatial coordinates of the receiving unit comprises determining spatial coordinates of the receiving unit by filtering the position determination operations based on a predetermined quality criterion, wherein the quality criterion comprises a number of received satellite signals and/or an individual assessment of the received satellite signals.

4. The method according to claim 2, wherein determining spatial coordinates of the receiving unit comprises determining spatial coordinates of the receiving unit by filtering the position determination operations based on a predetermined quality criterion, wherein the quality criterion comprises a number of received satellite signals and/or an individual assessment of the received satellite signals.

5. The method according to claim 1, in which the spatial coordinates of the primary coil of the ground unit are stored in the vehicle.

6. The method according to claim 1, in which the spatial coordinates of the primary coil of the ground unit are stored in the charging station.

7. The method according to claim 1, in which spatial coordinates of the primary coil of the ground unit which satisfy the predefined quality criterion are stored in a list.

8. The method according to claim 6, in which the number of spatial coordinates of the primary coil of the ground unit stored in the list does not exceed a predefined number of spatial coordinates.

9. The method according to claim 7, in which an estimated value of the spatial coordinates of the primary coil of the ground unit is formed from the number of spatial coordinates of the primary coil of the ground unit stored in the list, wherein this estimated value is used as the assumed spatial coordinates of the primary coil for further processing.

10. The method according to claim 8, in which an estimated value of the spatial coordinates of the primary coil of the ground unit is formed from the number of spatial coordinates of the primary coil of the ground unit stored in the list, wherein this estimated value is used as the assumed spatial coordinates of the primary coil for further processing.

11. The method according to claim 9, in which the estimated value is formed by averaging or by weighted averaging with a quality measure.

12. The method according to claim 9, in which the estimated value is formed by processing an item of time information relating to the capture of the spatial coordinates.

13. The method according to claim 7, in which the list is stored in the vehicle or in the charging station.

14. The method according to claim 5, in which, in addition to the spatial coordinates of the primary coil of the ground unit, an item of information relating to a vehicle type, which was used to determine the spatial coordinates, is stored.

15. The method according to claim 6, in which, in addition to the spatial coordinates of the primary coil of the ground unit, an item of information relating to a vehicle type, which was used to determine the spatial coordinates, is stored.

16. The method according to claim 1, in which odometric data relating to the vehicle, which were determined when approaching the ground station, are processed to determine the spatial coordinates.

17. The method according to claim 1, in which the spatial coordinates of the primary coil of the ground unit are determined during each charging process of the vehicle.

* * * * *